United States Patent [19]

Hofherr et al.

[11] Patent Number: 5,348,762
[45] Date of Patent: Sep. 20, 1994

[54] PROCESS FOR THE PRODUCTION OF CONDUCTIVE LAYERS

[75] Inventors: Walther Hofherr, Kirchzarten, Fed. Rep. of Germany; Ernst Minder, Sissach, Switzerland; Bruno Hilti, Basle, Switzerland; Jean-Philippe Ansermet, Morges, Switzerland

[73] Assignee: Ciba-Geigy Corporation, Ardsley, N.Y.

[21] Appl. No.: 62,038

[22] Filed: May 14, 1993

Related U.S. Application Data

[63] Continuation of Ser. No. 906,073, Jun. 29, 1992, abandoned.

[30] Foreign Application Priority Data

Jul. 2, 1991 [CH] Switzerland ............ 1951/91-6

[51] Int. Cl.$^5$ .......................................... B05D 5/12
[52] U.S. Cl. ..................... 427/121; 252/518; 252/519; 427/126.1; 427/126.2; 427/388.1; 427/389.7; 427/393.5; 427/393.6
[58] Field of Search ............ 252/500, 518, 519; 427/121, 384, 126.1, 126.2, 388.1, 389.7, 393.5, 393.6; 428/411.1, 420, 426

[56] References Cited

U.S. PATENT DOCUMENTS

5,009,812 4/1991 Finter et al. ............... 252/500
5,077,156 12/1991 Finter et al. ............... 430/16
5,096,780 3/1992 Finter et al. ............... 428/407

FOREIGN PATENT DOCUMENTS

362142 4/1990 European Pat. Off. .

OTHER PUBLICATIONS

Chemical Abstract 113(14):124680t, 1992.

*Primary Examiner*—Michael Lusignan
*Attorney, Agent, or Firm*—Kevin T. Mansfield; George R. Dohmann

[57] ABSTRACT

A process for the production of a conductive layer on a substrate, said conductive layer comprising a network of crystal needles of conductive radical cation salts based on tetrathiotetracenes, tetraselenotetracenes or tetratellurotetracenes and chlorine, bromine, iodine or copper dichloride, and said network is embedded in a polymer matrix, by coating at least one side of said substrate with a) a suspension of crystal needles of the radical cation salts of formula I in an inch solvent which may additionally contain a thermoplastic polymer or at least one starting compound for a thermosetting polymer, or b) a solution (b1) of a tetrathiotetracene, tetraselenotetracene or tetratellurotetracene, (b2) of a monomeric, oligomeric or polymeric organic compound which contains chlorine, bromine or iodone and, when heated with these tetracenes, forms a radical cation salt, or of anhydrous $CuCl_2$, a $CuCl_2$ aquo complex or a $CuCl_2$ solvent complex, and (C3) of a thermoplastic polymer or at least one starting compound for a thermosetting polymer, in an inert solvent, and subsequently evaporating the solvent, which process comprises applying said layer by spraying the suspension a) or solution b) from nozzles on to the substrate. Very fine meshed, dense and isotropic crystal needle networks are obtained. The coatings exhibit rapid surface discharges and are suitable for use as electostatic coatings or, on account of their good electrical conductivities, as electrode material for display elements.

20 Claims, No Drawings

PROCESS FOR THE PRODUCTION OF CONDUCTIVE LAYERS

This application is a continuation of application Ser. No. 07/906,073, filed Jun. 29, 1992, now abandoned.

The present invention relates to a process for the production of conductive layers of networks or polymer-encapsulated networks of crystal needles of conductive radical cation salts of tetrathiotetracenes, tetraselenotetracenes or tetratellurotetracenes and halogens or metal halides, which process comprises spraying suspensions of said radical cation salts in an inert solvent in which a polymer may be dissolved, or spraying a solution of said tetracenes and metal halides which may contain a polymer, or a solution of said tetracenes and an organic compound which, when heated with these tetracenes, forms a halide (radical cation salt), from nozzles on to a substrate and subsequently evaporating the solvent.

Substrates coated with conductive polymer layers which contain a needle network of radical cation salts of tetrathiotetracenes, tetraselenotetracenes or tetratellurotetracenes and metals salts or halogens in the polymer matrix are disclosed in EP-A-0 285 564. Substrates which are coated only with needle networks of such radical cation salts are disclosed in EP-A-0 362 141. Substrates in which these needle networks are embedded in halogen-containing polymers are disclosed in EP-A-0 362 142. Substrates in which these needle networks are embedded in halogen-containing and photosensitive polymers are disclosed in EP-A-0 362 143. The layers comprising the needle networks are produced by coating a substrate with solutions of said tetracenes which may contain a polymer and organic halogen-containing compounds or polymers which, when heated with these tetracenes, form a halide (radical cation salt), and subsequently evaporating the solvent.

Standard techniques are proposed for applying these layers, conveniently brushing, doctor coating and casting. When applying the layers by these techniques, an alignment of the crystal needles in the direction of coating is observed, and also relatively wide-meshed networks of crystal needles are formed which, however, have high conductivity. The surface discharge, however, is regarded as too slow. It is also not possible to coat irregular substrates using these techniques and very thin layers are not produced. The viscosity of the solutions used in these techniques can vary only within very narrow limits. Surprisingly, it has now been found that very fine-meshed, homogeneous and isotropic networks of crystal needles of the cited radical cation salts can be produced by spraying the coating on to the substrate. In this method the viscosity can vary within wide limits and the length of the crystal needles and the mesh width of the networks can be influenced by the size of the spray droplets. The conductivities of the of the coatings are comparable with those obtained by the techniques referred to above and the surface discharge is surprisingly better. In addition, excellent bonding to the substrates, especially to glass, is achieved.

Accordingly, the invention provides a process for the production of a conductive layer on a substrate, said conductive layer comprising a network of crystal needles of conductive radical cation salts of formula (I)

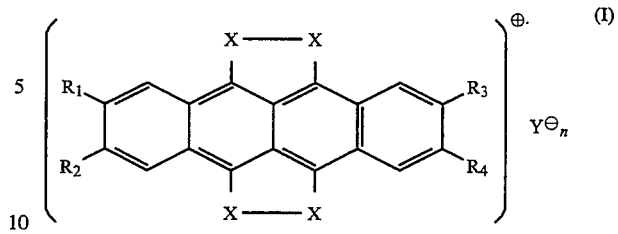

wherein X is S, Se or Te, n is a value from 0.3 to 0.9, $R_1$ is H, F, Cl or $CH_3$, and $R_2$, $R_3$ and $R_4$ are H, or $R_1$, $R_2$, $R_3$ and $R_4$ are each F or $CH_3$, or $R_1$ and $R_2$ are each F, Cl or $CH_3$ and $R_3$ and $R_4$ are each H, or $R_1$ and $R_3$ or $R_1$ and $R_4$ are each F and $R_2$ and $R_4$ or $R_2$ and $R_3$ are each H, and Y is Cl, Br, I or $CuCl_2$, and said network is embedded in a polymer matrix, by coating at least one side of said substrate with a) a suspension of crystal needles of the radical cation salts of formula I in an inert solvent in which a thermoplastic polymer or at least one starting compound for a thermosetting polymer may additionally be dissolved, or b) a solution of (b1) a compound of formula II

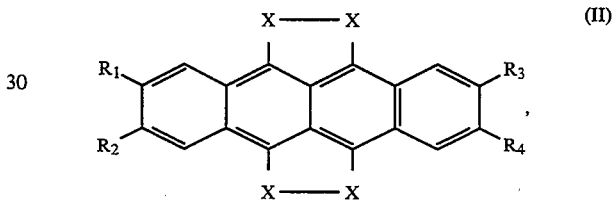

wherein $R_1$, $R_2$, $R_3$, $R_4$ and X are as previously defined, (b2) of a monomeric, oligomeric or polymeric organic compound which contains chlorine, bromine or iodine and, when heated with a compound of formula II, forms a compound of formula I, or of anhydrous $CuCl_2$, a $CuCl_2$ aquo complex or a $CuCl_2$ solvent complex, and (b3) of a thermoplastic polymer or at least one starting compound for a thermosetting polymer, in an inert solvent, and subsequently evaporating the solvent, which process comprises applying said layer by spraying the suspension a) or solution b) from nozzles on to the substrate.

The nozzles can be made of different material, conveniently of metals, alloys, glass and plastics materials. The nozzles are preferably made of glass or stainless steel.

The diameter of the nozzle orifices may be from 0.1 to 10 mm, preferably from 0.1 to 5 mm.

The pressure required for spraying is conveniently produced by a propellant gas, usually an inert gas, nitrogen or air, preferably argon or nitrogen.

The pressure of the propellant gas may be from $10^4$ to $10^4$ Pa, preferably from $2 \cdot 10^4$ to $5 \cdot 10^5$ Pa.

The temperature of the nozzle heads may be from room temperature to 250° C., preferably from 50° to 200° C.

The distance of the nozzle heads from the substrate is normally from 1 to 100 cm, preferably from 5 to 50 cm.

It is possible to use more than one nozzle head, conveniently 2 to 10 nozzle heads, simultaneously, in which case the same or different solutions may be used for coating the substrate.

Examples of suitable substrates are glass, metals, plastics, mineral and ceramic materials, wood and paper. The surfaces of plastics materials can swell with the solvents employed such that pure networks of crystal needles are able to penetrate some way into these surfaces. The substrates may be of any external shape and are typically mouldings, filaments, fibres, fabrics, bars, pipes, ribbons, sheets, boards, rolls or casings. The concentration of the compounds of formulae I and II can be from 0.1 to 20% by weight, preferably from 0.1 to 10% by weight and, most preferably, from 0.1 to 5% by weight, based on the suspension or the solution.

When using polymers or starting materials for polymers concurrently, their concentration in the solution can be up to 60% by weight, preferably 0.1 to 50 by weight and, most preferably, from 0.2 to 30% by weight.

In one embodiment of the inventive process, the layer can be applied by electrostatic methods.

In a preferred embodiment of the process of the invention the substrate is preheated, conveniently to 250° C., preferably to 50+−200° C.

The radical cation salts of formula I, wherein Y is Cl, Br or I, are known and described, inter alia, in the European patent applications cited at the outset. The radical cation salts of formula I, wherein Y is $CuCl_2$, are novel and can be prepared in a manner known per se by reacting anhydrous $CuCl_2$, $CuCl_2$ aquo complex or a $CuCl_2$ solvent complex of tetrathiotetracenes, tetraselenotetracenes or tetratellurotetracenes in an organic solvent.

Very numerous solvent complexes of copper dichloride and polar aprotic or polar protic solvents are known. It is possible to use monomeric, dimeric and polymeric complexes. Suitable solvents are mainly those containing hetero atoms, typically oxygen, sulfur, phosphorus and nitrogen. Representative examples are ethers (diethyl ether, dibutyl ether, ethylene glycol dimethyl or diethyl ether), esters and lactones (ethyl acetate, γ-butyrolactone), sulfones (dimethyl sulfone, tetramethylene sulfone) and amines (pyridine, α-pyridone, a-methyl pyridine, ethylenediamine, N,N-dimethylethylenediamine, 1-(β-aminoethyl)pyridine, 1-(β-methylaminoethyl)pyridine.

The reaction is carded out in the presence of an inert solvent. Exemplary of suitable solvents, which can be used singly or as a mixture of solvents, are aliphatic and aromatic hydrocarbons, typically hexane, cyclohexane, methyl cyclohexane, benzene, nitrobenzene, toluene, xylene and biphenyl; alcohols such as methanol, ethanol, propanol and butanol; ethers such as diethyl ether, diethylene glycol dimethyl ether, ethylene glycol dimethyl ether, diphenyl ether, tetrahydrofuran and dioxane; halogenareal hydrocarbons such as methylene chloride, chloroform, 1,1,2,2-tetrachloroethane and chlorobenzene; esters and lactones such as ethyl acetate, butyrolactone, valerolactone; carboxamides and lactams such as dimethyl formamide, dimethyl acetamide and N-methylpyrrolidone. If the reactants are sparingly soluble, they can be used in the form of suspensions in a solvent.

The inventive process is conveniently carried out at elevated temperature, typically in the range from 30° to 300° C., preferably 50° to 250° C. The procedure may conveniently comprise adding a solution of the copper compound to a hot solution of compounds of formula II and then allowing the reaction mixture to cool. The crystalline precipitate is then isolated by filtration and, if desired, purified by washing and dried. If larger crystals are desired, a diffusion-controlled reaction is carried out by separating the solid reactants separately in the storage vessels of a reactor and then covering them with a solvent. The radical cation salts are obtained in high purity.

Preferred compounds of formula I are (tetrathiotetracene)$Cl_{0.5}$, (tetrathiotetracene)$Br_{0.5}$, (tetrathiotetracene)$I_{0.75}$, (tetraselenotetracene)$Cl_{0.5}$, (2-fluoro- or 2,3-difluorotetrathio- or -tetraselenotetracene)$Cl_{0.5}$, (2-fluoro- or 2,3-difluortetrathio- or -etraselenotetracene)$Br_{0.5}$ and (tetrathiotetracene)$(CuCl_2)_{0.4 \text{ to } 0.6}$.

X in formula I is preferably S or Se and n is preferably a value from 0.3 to 0.8. When X is Cl or Br, n is preferably 0.5; when X is I, n is preferably a value from 0.7 to 0.8, and when X is $CuCl_1$, n is preferably a value from 0.4 to 0.5.

Suitable inert solvents for polymers and starting materials for polymers are typically polar and, preferably, aprotic solvents, which may be used singly or in mixtures of at least two solvents. Representative examples of such solvents are: ethers (dibutyl ether, tetrahydrofuran, dioxane, ethylene glycol monomethyl or dimethyl ether, ethylene glycol monoethyl or diethyl ether, diethylene glycol diethyl ether, triethylene glycol dimethyl ether), halogenareal hydrocarbons (methylene chloride, chloroform, 1,2-dichloroethane, 1,1,1-trichloroethane, 1,1,2,2-tetrachloroethane), carboxylates and tactones (ethyl acetate, methyl propionate, ethyl benzoate, 2-methoxyethyl acetate, γ-butyrolactone, δ-valerolactone, pivalolactone), carboxamides and lactams (N,N-dimethylformamide, N,N-diethylformamide, N,N-dimethylacetamide, tetramethylurea, hexamethylphosphoric triamide, γ-butyrolactam, ε-caprolactam, N-methylpyrrolidone, N-acetylpyrrolidone, N-methylcaprolactam), sulfoxides (dimethyl sulfoxide), sulfones (dimethyl sulfone, diethyl sulfone, trimethylene sulfone, tetramethylene sulfone), tertiary amines (N-methylpiperidine, N-methylmorpholine) substituted benzenes (benzonitrile, chlorobenzene, o-dichlorobenzene, 1,2,4-trichlorobenzene, nitrobenzene, toluene, xylene) and nitriles (acetonitrile, propionitrile).

The solvents in process step a) can act simultaneously as suspension agents and they may contain minor amounts, typically 0.001 to 2% by weight, of a dispersant, based on the amount of solvent. However, in this process step it is also possible to use aqueous or aqueous-organic systems as solvent or suspension agent.

The thermoplastic polymers may be selected from the following polymers, copolymers or mixtures thereof:

1. Polymers of monoolefins and diolefins, for example polypropylene, polyisobutylene, polybut-1-ene, polymethylpent-1-ene, polyisoprene or polybutadiene, as well as polymers of cycloolefins, for example of cyclopentene or norbornene, polyethylene (which can be uncrosslinked or crosslinked), for example high density polyethylene (HDPE), low density polyethylene (LDPE and linear low density polyethylene (LLDPE).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers linear low density polyethylene (LLDPE) and mixtures thereof with low density polyethylene (LDPE), propylene/but-1-ene copolymers, ethylene/hexene copolymers, ethylene/- methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate or ethylene/acrylic acid copolymers and their salts (ionomers), as well as terpolymers of ethylene with propylene and a diene such as hexadiene, dicyclopentadiene or ethylidenenorbornene; and also mixtures of such copolymers with each other and with polymers mentioned in 1) above, for example polypropylene/ethylene propylene copolymers, LDPE/EVA, LDPE/EAA, LLDPE/EVA and LLDPE/EAA.

3a. Hydrocarbon resins (for example $C_5$–$C_9$), including hydrogenated modifications thereof (for example tackifiers).

4. Polystyrene, poly-(p-methylstyrene), poly-(α-methylstyrene).

5. Copolymers of styrene or α-methylstyrene with dienes or acrylic derivatives, for example styrene/butadiene, styrene/acrylonitrile, styrene/alkylmethacrylate, styrene/butadiene/alkylacrylate, styrene/maleic anhydride, styrene/acrylonitrile/methyl acrylate; mixtures of high impact strength from styrene copolymers and another polymer, for example from a polyacrylate, a diene polymer or an ethylene/propylene/diene terpolymer; and block copolymers of styrene, for example styrene/butadiene/styrene, styrene/isoprene/styrene, styrene/ethylene/butylene/styrene or styrene/ethylene/propylene/styrene.

6. Graft copolymers of styrene or α-methylstyrene, for example styrene on polybutadiene, styrene on polybutadiene/styrene or polybutadiene/acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyalkylacrylates or polyalkylmethacrylates, styrene and acrylonitrile on acrylate/butadiene copolymers, as well as mixtures thereof with the copolymers listed under 5), for example the copolymer mixtures known as ABS, MBS, ASA or AES polymers.

7. Halogenated polymers such as polychloroprene, chlorinated rubbers, chlorinated or sulfochlorinated polyethylene, copolymers of ethylene and chlorinated ethylene, epichlorohydrin homo- and copolymers, preferably polymers of halogenated vinyl compounds, for example poly- vinylchloride, polyvinylidene chloride, polyvinyl fluoride, polyvinylidene fluoride, as well as copolymers thereof, for example vinyl chloride/vinylidene chloride, vinyl chloride/vinyl acetate or vinylidene chloride/vinyl acetate copolymers.

8. Polymers derived from α,β-unsaturated acids and derivatives thereof, such as polyacrylates and polymethacrylates, polyacrylamides and polyacrylonitriles.

9. Copolymers of the monomers mentioned under 8) with each other or with other unsaturated monomers, for example acrylonitrile/butadiene copolymers, acrylonitrile/alkylacrylate copolymers, acrylonitrile/alkoxyalkylacrylate or acrylonitrile/vinyl halide copolymers or acrylonitrile/alkylmethacrylate/butadiene terpolymers.

10. Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinylbutyrate, polyallyl phthalate or polyallylmelamine; as well as their copolymers with the olefins mentioned in 1) above.

11. Homopolymers and copolymers of cyclic ethers such as polyalkylene glycols, polyethylene oxide, polypropylene oxide or copolymers thereof with bisglycidyl ethers.

12. Polyacetals such as polyoxymethylene and those polyoxymethylenes which contain ethylene oxide as a comonomer, polyacetals modified with thermoplastic polyurethanes, acrylates or MBS.

13. Polyphenylene oxides and sulfides and mixtures thereof with polystyrene or polyamides.

14. Polyurethanes which are derived from polyethers, polyesters or polybutadienes carrying terminal hydroxyl groups on the one hand and aliphatic or aromatic polyisocyanates on the other, as well as precursors thereof.

15. Polyamides and copolyamides which are derived from diamines and dicarboxylic acids and[ch]or from aminocarboxylic acids or the corresponding lactams, such as polyamide 4, polyamide 6, polyamide 6/6, 6/10, 6/9, 6/12 and 4/6, polyamide 11, polyamide 12, aromatic polyamides obtained by condensation of m-xylene, diamine and adipic acid; polyamides prepared from hexamethylenediamine and isophthalic and/or terephthalic acid, with or without an elastomer as modifier, for example poly-2,4,4,-trimethylhexamethylene terephthalamide or poly-m-phenylene isophthalamide; block copolymers of the aforementioned polyamides with polyolefins, olefin copolymers, ionomers or chemically bonded or grafted elastomers; or with polyethers, for example with polyethylene glycol, polypropylene glycol or polytetramethylene glycol; and also polyamides or copolyamides modified with EPDM or ABS, and polyamides condensed during processing (RIM polyamide systems).

16. Polyureas, polyimides and polyamide-imides and polybenzimidazoles.

17. Polyesters derived from dicarboxylic acids and diols and/or from hydroxycarboxylic acids or the corresponding lactones, such as poly-ethylene terephthalate, polybutylene terephthalate, poly-1,4-dimethylolcyclohexane terephthalate, polyhydroxybenzoates as well as block-copolyether esters derived from hydroxyl-terminated polyethers; and also polyesters modified with polycarbonates or MBS.

18. Polycarbonates and polyester carbonates.

19. Polysulfones, polyether sulfones and polyether ketones.

20. Polyethers of diglycidyl compounds, including diglycidyl ethers and diols, for example of bisphenol A diglycidyl ether and bisphenol A.

21. Natural polymers such as cellulose, rubber, gelatine and chemically modified homologous derivatives thereof such as cellulose acetates, cellulose propionates and cellulose butyrates, or the cellulose ethers, such as methylcellulose; as well as rosins and their derivatives.

22. Mixtures (polyblends) of the aforementioned polymers, for example PP/EPDM, Polyamide 6/EPDM or ABS, PVC/EVA, PVS/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPE/HIPS, PPE/PA 6.6 and copolymers, PA/HDPE, PA/PP, PA/PPO.

Preferred thermoplastic polymers are polyolefins, polystyrene, polyvinyl chloride, polyvinylidene chloride, polyvinylidene fluoride, polyacrylates, polymethacrylates, polyamides, polyesters, polycarbonates, aromatic polysulfones, aromatic polyethers, aromatic polyether sulfones, polyimides and polyvinyl carbazole.

The starting compounds for thermosetting polymers can be those compounds which lead to the following thermosetting polymers:

1. Crosslinked polymers which are derived from aldehydes on the one hand and phenols, ureas and melamines on the other hand, such as phenol/formaldehyde resins, urea/formaldehyde resins and melamine/formaldehyde resins.

2. Drying and non-drying alkyd resins.

3. Unsaturated polyester resins which are derived from copolyesters of saturated and unsaturated dicarboxylic acids with polyhydric alcohols and vinyl compounds as crosslinking agents, and also halogen-containing modifications thereof of low flammability.

4. Crosslinkable acrylic resins derived from substituted acrylic esters such as epoxy acrylates, urethane acrylates or polyester acrylates.

5. Alkyd resins, polyester resins or acrylate resins which are cross-linked with melamine resins, urea resins, polyisocyanates or epoxy resins.

6. Rubber derived from crosslinked polydienes, for example butadiene or isoprene; silicon rubber.

7. Crosslinked epoxy resins which are derived from polyepoxides, for example from bisglycidyl ethers or from cycloaliphatic diepoxides, and which may contain a hardener as crosslinking agent or which are cross-linked thermally using curing accelerators or by irradiation.

Among the crosslinked polymers, crosslinked epoxy resins are preferred which, as polyepoxides, are derived preferably from glycidyl compounds which contain on average two epoxy groups in the molecule. Particularly suitable glycidyl compounds are those which contain two glycidyl groups, $\beta$-methylglycidyl groups or 2,3-epoxycyclopentyl groups attached to a hetero atom (e.g. sulfur, preferably oxygen or nitrogen), in particular bis(2,3-epoxycyclopentyl) ether; diglycidyl ethers of polyhydric aliphatic alcohols, such as 1,4-butanediol, or polyalkylene glycols, such as polypropylene glycols; diglycidyl ethers of cycloaliphatic polyols, such as 2,2-bis(4-hydroxycyclohexyl)propane; diglycidyl ethers of polyhydric phenols, such as resorcinol, bis(p-hydroxyphenyl)methane, 2,2-bis-(p-hydroxyphenyl)propane (=diomethane), 2,2-bis(4'-hydroxy-3',5'-dibromophenyl) -propane, 1,3-bis(p-hydroxyphenyl)ethane; bis($\beta$-methylglycidyl)ethers of the above dihydric alcohols or dihydric phenols; diglycidyl esters of dicarboxylic acids, such as phthalic acid, terephthalic acid, $\Delta_4$-tetrahydrophthalic acid and hexahydrophthalic acid; N,N-diglycidyl derivatives of primary amines and amides and heterocyclic nitrogen bases which contain two N-atoms, and N,N'-diglycidyl derivatives of disecundary diamides and aliamines, such as N,N-diglycidylaniline, N,N-diglycidyltoluidine, N,N-diglycidyl-p-aminophenyl methyl ether, N,N'-dimethyl-N,N'-diglycidyl-5,5-dimethylhydantoin, N,N'-diglycidyl-5-isopropyl-hydantoin, N,N-methylenebis(N',N'-diglycidyl-5,5-dimethylhydantoin), 1,3-bis(N-glycidyl-5,5-dimethylhydantoin)-2-hydroxypropane; N,N'-diglycidyl-5,5-dimethyl-6-isopropyl-5,6-dihydrouracil, triglycidyl isocyanurate.

A preferred group of epoxy resins comprises glycidylated novolaks, hydantoins, aminophenols, bisphenols and aromatic diamines or cycloaliphatic epoxy compounds. Particularly preferred epoxy resins are glycidylated cresol novolaks, bisphenol A and bisphenol F diglycidyl ether, hydantoin-N,N'-bisglycide, p-aminophenol triglycide, diaminodiphenylmethane tetraglycide, vinylcyclohexene dioxide, 3,4-epoxycyclohexylmethyl-3,4-epoxycyclohexanecarboxylate or mixtures thereof.

Further suitable epoxy resins are prereacted adducts of such epoxy compounds with epoxy hardeners, for example an adduct of bisphenol A diglycidyl ether and bisphenol A, or adducts which have been prereacted with oligoesters which carry two terminal carboxyl groups and epoxides.

Suitable hardeners for epoxy resins are acid or basic compounds. Illustrative examples of suitable hardeners are: polyhydric phenols (resorcinol, 2,2-bis(4-hydroxyphenyl)propane) or phenol-formaldehyde resins; polybasic carboxylic acids and the anhydrides thereof, such as phthalic anhydride, tetrahydrophthalic anhydride, hexahydrophthalic anhydride, 4-methylhexahydrophthalic anhyckride, 3,6-endomethylene-tetrahydrophthalic anhydride, 4-methyl-3,6-endomethylen-tetrahydrophthalic anhydride (methylnadic anhydride), 3,4,5,6,7,7-hexachloroendomethylene-tetrahydrophthalic anhydride, succinic anhydride, adipic anhydride, trimethyladipic anhydride, sebacic anhydride, maleic anhydride, dodecylsuccinic anhydride, pyromellitic dianhydride, trimellitic anhydride, benzophenonetetracarboxylic dianhydride, or mixtures of such anhydrides.

A preferred group of hardeners comprises novolaks and polycarboxylic anhydrides.

The epoxy resins can also be additionally cured with curing accelerators or only with thermal curing catalysts. Exemplary of curing accelerators and catalysts are 3-ethyl-4-methylimidazole, triamylammonium phenolate; mono- or polyphenols (phenol, diomethane, salicylic acid); boron trifluoride and the complexes thereof with organic compounds, such as boron trifluoride ether complexes and boron trifluoride amine complexes ($BF_3$/monoethylamine complex); phosphoric acid and triphenylphosphite.

Curing accelerators and catalysts are normally added in an amount of 0.1 to 10% by weight, based on the epoxy resin. Hardeners for epoxy resins are normally used in equimolar amounts, based on the epoxy groups and functional groups of a hardener.

The suspensions of process step a) may also contain dissolved radiation-sensitive materials from which relief images can be obtained by irradiation under a photomask and subsequent development. They may be positive or negative systems. Such materials are described by, inter alia, G. E. Green in J. Macro. Sci.-Revs. Macr. Chem., C21(2), 187–273 (1981–82) and by G. A. Delzenne in Adv. Photochem., 11, p. 1–103 (1979). The radiation-sensitive materials can be used alone or together with a binder, conveniently with at least one of the previously mentioned polymers. They are mainly photopolymerisable or photocrosslinkable systems which normally contain photosensitisers and/or photoinitiators. They may be non-volatile monomeric, oligomeric or polymeric substances which contain photopolymerisable or photodimerisable ethylenically unsaturated groups, cationically curable systems or photocrosslinkable polyimides. Such polyimides are described, inter alia, in EP-A-0 132 221, EP-A-0 134 752, EP-A-0 162 017, EP-A-0 181 837 and EP-A-0 182 745.

The suspensions suitable for use in the practice of this invention may contain further additives for enhancing the processing properties, the mechanical, electrical and thermal properties, the surface properties and the light stability of polymers, for example finely particulate fillers, reinforcing agents, plasticisers, lubricants and mould release agents, adhesion promoters, antistatic agents, antioxidants, heat and light stabilisers, pigments and dyes.

In process step b) the same solvents, polymers and additives may be used as in process step a). The compounds of formula II are known and are described, inter alia, in the published European patent applications mentioned at the outset. $R_1$ to $R_4$ and X in the compounds of formula II have the same preferred meanings as those given for the compounds of formula I. Heating typically means applying heat in the temperature range from room temperature to 350° C., preferably from 50° to 200° C. Heating can be effected before, during and/or after spraying. It has been found expedient to heat the suspension in process a) in the temperature range from 20°–350° C., preferably from 20°–200° C., and to heat the solution in process b) in the temperature range from 50°–350° C., preferably from 50-200° C. The ratio of compound containing Cl, Br or I to the compound of formula II is preferably 10:1 to 1:5, more particularly 5:1 to 1:3 and, most preferably 2:1 to 1:2. The halogen-containing organic compound may, however, also be present in substantially greater amount and can act as solvent for the thermoplastic polymer or a starting compound for a thermosetting polymer and the compound of formula II if said halogen-containing organic compound is in liquid form. The organic compound can also be solid and it should be miscible and compatible with the polymer.

The organic compound which contains chlorine, bromine or iodine may be selected from the group consisting of halogenated, saturated or unsaturated aliphatic, cycloaliphatic, aliphatic-heterocyclic, aromatic or heteroaromatic organic compounds which may be substituted by —CN, HO—, =I, $C_1$–$C_4$alkyl, $C_1$–$C_4$alkoxy, —CO—$C_1$–$C_4$alkyl, —COO$C_{11}$–$C_4$alkyl. The halogen compounds may be used individually or in mixtures. The organic compound is preferably chlorinated and/or brominated. The compounds may be monohalogenated and are typically N-brominated or N-chlorinated dicarboximides. C-Halogenated compounds preferably have a higher degree of halogenation, preferably of at least up to 80%, and are preferably C-brominated and/or C-chlorinated. Compounds whose halogen atoms are activated by electrophilic groups are especially useful. Representative examples of halogenated organic compounds are: tetrabromomethane, bromoform, trichlorobromomethane, hexachloropropene, hexachlorocyclopropane, hexachlorocyclopentadiene, hexachloroethane, N-chlorosuccinimide, octachloropropane, n-octachlorobutane, n-decachlorobutane, tetrabromoethane, hexabromoethane, tetrabromo-o-benzoquinone, 2,4,4,6-tetrabromo-2,5-cyclohexadienone, hexabromobenzene, chloranil, hexachloroacetone, 1,4,5,6,7,7-hexachloro-5-norbornene-2,3-dicarboxylic acid, 1,2,5,6,9, 10-hexabromocyclododecane, tetrachloroethylene, perchlorocyclopentadiene, perchlorobutadiene, dichloroacetaldehyde diethyl acetal, 1,4-dichlorobut-2-ene, 1,3-dichlorobut-2-ene, 3,4-dichlorobut-1-ene, tetrachlorocyclopropene, 1,3-dichloroacetone, 2,3,5,6-hexachloro-p-xylene, 1,4-bis(trichloromethyl)benzene, 1,3-dibromopropane, 1,6-dibromohexane, ethyl 3-chloropropionate, 3-chlorotoluene, methyl 2-chloropropionate, 2-chloroacrylonitrile, ethyl trichloroacetate, 1,2,3-trichloropropane, 1,1,2-trichloroethane, butyl chloroformate, trichloroethylene, 2,3-dichloromaleic anhydride, 1,12-dibromododecane, $\alpha,\alpha'$-dibromo-p-xylene, $\alpha,\alpha'$-dichloro-o-xylene, phenacyl chloride or bromide, 1,10-dibromodecane, $\alpha,\alpha'$-dichloro-p-xylene, $\alpha,\alpha\alpha$-dibromo-m-xylene, iodoacetonitrile, 2,3-dichloro-5,6-dicyanobenzoquinone, methyl 2,3-dichloropropionate, 1-bromo-2-chloroethane, 1-bromo-2-chloropropane, 2-bromoethyl chloroformate, ethyl iodoacetate, N-chloro-, N-bromo- or N-iodosuccinimide or N-iodophthalimide, or mixtures thereof. The organic compound may also be tri($C_1$–$C_6$alkyl)ammonium hydrochloride, in which case aqueous $H_2O_2$ solution is additionally used.

Oligomers and polymers which contain chlorine, bromine or iodine are disclosed, inter alia, in EP-A-0 362 142. They may be compounds which contain in one backbone comprising at least two monomer units, typically 1 to 10 000, preferably 2 to 5 000, units, aliphatic or cycloaliphatic side-groups bound through a —O—, —O—CO—, —CO—$R_5$—OCO— or —CO—O— group, which side-groups are substituted in $\alpha$-, $\beta$-, $\gamma$- or $\omega$-position by at least one chlorine, bromine or iodine atom, and $R_5$ is unsubstituted or OH-substituted $C_1$–$C_{12}$alkylene, $C_4$–$C_{12}$-cycloalkylene, benzylene or xylylene. The aliphatic and cycloaliphatic side groups are preferably substituted in $\alpha$-, $\beta$- or $\gamma$-position, most preferably in $\alpha$- or $\beta$-position, by Cl, Br or I. The side-group preferably contains 1 to 4 carbon atoms and is partially or completely substituted by Cl, Br or I, preferably by Cl. Particularly preferred is chlorine-substituted methyl or ethyl, typically —$CH_2Cl$, —$CHCl_2$, —$CCl_3$, —$CHClCH_3$, —$CCl_2$ $CH_3$, —$CHClCH_2Cl$, —$CCl_2CH_2Cl$, —$CHClCHCl_2$, —$CCl_2CHCl_2$, —$CCl_2CCl_3$, —$CH_2CH_2Cl$, —$CH_2CHCl_2$, and —$CH_2CCl_3$.

Preferred oligomers and polymers are those containing structural units of formula III

$$—ORO—CH_2CH(OR_6)CH_2— \qquad (III),$$

wherein $R_6$ is a radical of formula $C_1$–$C_4$alkyl—CO which contains chlorine, bromine or iodine, and R is a divalent organic radical of preferably 2 to 20 carbon atoms, typically $C_2$–$C_{20}$alkylene, $C_5$–$C_{12}$cycloalkylene or $C_6$–$C_{20}$arylene, which radicals are unsubstituted or substituted by $C_1$–$C_6$alkyl or $C_1$–$C_6$alkoxy or Cl or Br. Preferred radicals R are derived from alkylidene or cycloalkylidene bisphenols, as from bisphenol A or bisphenol F.

The oligomers and polymers may be the radiation-sensitive chlorine-, bromine- and iodine-containing compounds disclosed, inter alia, in EP-A-0 362 143. The oligomers and polymers may be used singly or together with at least one of the above-described polymers as binder.

The chlorine-, bromine- and iodine-containing compounds as well as the copper dihalides react with the compounds of formula II under the action of heat to form needle-shaped radical cation salts of formula I, the crystal needles simultaneously forming networks.

The inventive process a) can be carried out by preparing a suspension of the radical cation salts of formula I which may additionally contain a thermoplastic polymer or at least one starting material for thermosetting polymers dissolved in the suspension agent, subsequently spraying said suspension on to the substrate which may be preheated, and then evaporating the suspension agent (solvent) by heating, conveniently in the temperature range from 50°–250° C. If several starting materials for thermosetting polymers are used, these may be used in one solution or in separate solutions, in which latter case mixing can be effected in the nozzle head. The starting materials for thermosetting polymers are fully cured by heating after evaporation of the solvent.

The suspension process affords the advantage that corrosion problems in the equipment employed can be largely avoided, as no redox systems are used as in process b).

In process b) the individual components are dissolved jointly or separate solutions are prepared, which are then combined before carrying out the process. The solutions can be combined in a storage vessel or in the nozzle head. The formation of the radical cation salts of formula I can begin when the radical cation salts of formula I are combined, whereupon suspensions are formed. Salt formation can also take place when the spray droplets form. An essential advantage of the inventive process resides in the possibility of influencing the size of the crystal needles and the mesh width of the needle networks selectively by different parameters, for example temperature (of the solutions, of evaporation and of the preheated substrate), concentrations of the polymers and radical cation salts and compounds of formula II, viscosities of the spray solutions, pressure and size of the nozzle orifices or droplet size.

The evaporation of the solvent is normally carded out in a temperature range which suffices for the simultaneous formation of the radical cation salts, typically 50°–250° C. When using planar substrates the coatings can be peeled off after cooling and self-supporting films or sheets produced. Pure needle networks can be provided with a protective layer of plastics and, in that case, afterwards peeled from the substrate.

The layer thicknesses can vary over a wide range, depending on length and repetition of the coating technique. They may typically be from 0.01 to 5000 $\mu$m, preferably from 0.1 to 1000 $\mu$m and, most preferably from 0.1 to 500 $\mu$m. In a brief application, layer thicknesses of 0.01 to 20 $\mu$m can be achieved.

Depending on the choice of polymer, the novel process affords opaque or transparent coatings which have outstanding electrical properties. Thus, surprisingly, the coatings and films or sheets have an excellent discharge capacity which, for heterogeneous materials, is otherwise difficult to achieve or cannot be achieved at all. The coatings are therefore especially suitable for providing mouldings with an antistatic finish or for the electrostatic screening of components and mouldings. The high conductivities also permit the use of the coatings as electric conductors, for example as electrodes for display elements or electronic components. The coatings also have excellent mechanical strength and performance properties. The coatings are also suitable for use as conductive layers for smoothing the potential of high-tension cables, as electrostatic VDU coatings and as coloured electrostatic colour coatings. A further advantage of the inventive process resides in the possibilities of making large-area coatings and of fully coating three-dimensional objects.

The following Examples illustrate the invention in more detail.

A) Preparation of the Radical Cation Salts

EXAMPLE A1

With stirring, 60 mg of (TTT) are dissolved in 33 g $\gamma$-butyrolactone under argon at a bath temperature of 180° C. (green solution). Then a yellow solution of 15.3 mg of $CuCl_2 \cdot 2 H_2O$ in 5 g of $\gamma$-butyrolactone is added. The stirrer and the oil bath heating are switched off and the reaction solution is then cooled in the oil bath, whereupon needles crystallise (yield: 57 mg). The specific resistance of the crystals is 0.5 to 1 $\Omega$·cm. The X-ray structural analysis shows that the product is the radical cation salt of the composition $TTT(CuCl_2)_{0.45}$.

B) Use Examples

EXAMPLE B1

9.0 mg of TTT and 0.6 g of polycarbonate are dissolved at 160° C. in 18 g of $\gamma$-butyrolactone and the solution is mixed with a solution of 2.1 mg of $CuCl_2 \cdot 2H_2O$ in 2 g of $\gamma$-butyrolactone. The reaction mixture is sprayed on to a preheated glass plate (spray conditions: glass nozzle with a diameter of 1 mm, propellant gas argon, distance of spray nozzle from glass plate c. 15 cm). The solvent is evaporated at 130° C. to leave a 8 $\mu$m layer with a fine needle network of conductive crystal needles of $TTT(CuCl_2)_{0.48}$ in a polycarbonate matrix. The specific resistance is $2.4 \cdot 10^3$ $\Omega$cm. The layer thickness is c. 5 $\mu$m.

EXAMPLE B2

9.0 mg of tetrathiotetracene and 0.6 g of polycarbonate are dissolved at 150° C. in 16 g of anisole. To this solution is added a solution of 2.0 mg of $CuCl_2 \cdot 2H_2O$ in 2 g of $\gamma$-butyrolactone. Small needles of the radical cation salt crystallise at once. The reaction mixture is sprayed onto a preheated glass plate (spray conditions as in Example B 1) and the solvent is evaporated at 100° C. The polycarbonate film is transparent and contains a fine, dense, conductive needle network. The specific resistance is 6 $10^3$ $\Omega$cm. The layer thickness is c. 4 $\mu$m.

EXAMPLE B3

17.9 mg of tetraselenotetracene and 0.9 g of polycarbonate are dissolved at 130° C. in 24 g of N-methylpyrrolidone. After 25 minutes 40 $\mu$l of hexachloropropene are added. The reaction mixture is stirred briefly and then sprayed on to a preheated glass plate (two-fluid steel nozzle, propellant gas argon, distance of nozzle from glass plate c. 20 cm). Afterwards the solvent is evaporated at 100° C. The polycarbonate film is transparent and contains a fine, dense conductive needle network. The specific resistance is 1.4 $\Omega$cm. The layer thickness is c. 5 $\mu$m.

EXAMPLE 4

8.0 mg of tetraselenotetracene and 0.6 g of polycarbonate are dissolved at 160° C. in 20 g of $\gamma$-butyrolactone. Afterwards 8 $\mu$l of hexachloropropene are added and the mixture is sprayed on to a glass plate (glass nozzle with a diameter of 1 mm, propellant gas argon, distance of nozzle from glass plate 15 cm). The solvent is evaporated at 100° C. to leave a transparent film containing a fine crystal needle network of (tetraselenotetracene)₂Cl in the polycarbonate matrix. The specific resistance is 90 Ωcm. The layer thickness is 5 μm.

EXAMPLE B5

15.27 mg of tetrathiotetracene and 3.75 g of a polyether of a diglycidyl ether of bisphenol A and bisphenol A are dissolved at 150° C. in 60 g of anisole. After about 30 mutes, 2.5 g of a solution of 3.75 mg of $CuCl_2 \cdot 2H_2O$ and 2% of water in 2.5 g of γ-butyrolactone and 750 μl of an anisole solution containing 10% of a polyurethane oligomer (wetting agent) in xylene are added and mixed. The reaction mixture is sprayed on to a μlass plate (spray conditions: two-fluid steel nozzle, propellant gas argon, distance of spray nozzle from glass plate c. 20 cm, spray rate 4 cm/s). The solvent is evaporated at 50° C. to leave a 5 μm layer with a dense network of conductive crystal needles of $TTT(CuCl_2)_{0.43}$ in a polyether matrix. The specific resistance is $2 \cdot 10^3$ Ωcm.

EXAMPLE B6

44.18 mg of tetraselenotetracene and 3 g of a polyether of a diglycidyl ether of bisphenol A and bisphenol A are dissolved at 150° C. in 48 g of N-methylpyrrolidone (NMP). After about 45 minutes, 400 μl of a solution of NMP containing 1% of trimethylammonium hydrochloride and 2% of water are added, followed by the addition of 300 μl of a solution of $H_2O_2$ in NMP/water (9:1). The mixture is sprayed on to a glass plate (spray conditions: (two-fluid steel nozzle, propellant gas argon, distance of nozzle from glassplate c. 20 cm, spraying rate 4 cm/s). The solvent is evaporated at 100° C. to leave a 5 μm layer containing a dense needle network of conductive crystal needles of (tetraselenotetracene)₂Cl in a polyether matrix. The conductivity is 1 S/cm. The layer bonds excellently to the glass substrate.

EXAMPLE B7

The surface tension of c. 200 V is formed with the aid of a gold-plated tungsten wire of 50 micrometer diameter which is charged with a voltage of c. 3.4 kV. This voltage is so controlled that the current is kept at a constant 20 nA per cm wire length. The specimen is bonded with silver paste to a glass support and connected to a contact point at the edge of the support. In the course of an assay, the support shifts 8 mm under the corona wire at a speed of c. 50 crn/s and stops at the point where the contact point dips into an earthed conductive foam. The specimen then lies under a field strength meter (Isoprobe Electrostatic Voltmeter 244, Monroe Electronics Inc.). The decrease in the measured surface tension is stored with a digital oscilloscope. The sheets of Examples B1, B2 and B4 are tested in this test. The surface tension is measured 0.5 second after the corona charge. Result: Example B1: 2±1 volt, Example B2:2±1 volt; Example B4:3±1 volt.

What is claimed is:

1. A process for preparing a conductive layer on a substrate wherein said conductive layer is a network of crystal needles embedded in a polymer matrix and said crystal needles consist essentially of a conductive radial cation salt of formula (I)

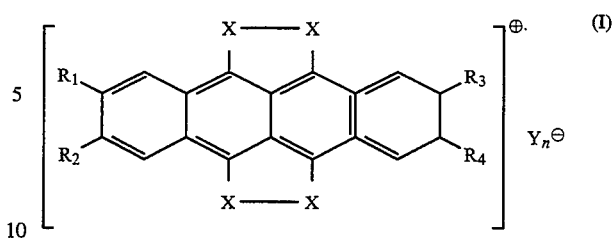

wherein X is S, Se or Te, n is a value from 0.3 to 0.9, $R_1$ is H, F, Cl or $CH_3$, and $R_2$, $R_3$ and $R_4$ are H, or $R_1$, $R_2$, $R_3$ and $R_4$ are each F or $CH_3$, or $R_1$ and $R_2$ are each F, Cl or $CH_3$ and $R_3$ and $R_4$ are each H, or $R_1$ and $R_3$ or $R_1$ and $R_4$ are each H, or $R_1$ and $R_3$ or $R_1$ and $R_4$ are each F and $R_2$ and $R_4$ or $R_2$ and $R_3$ are each H, and Y is Cl, Br, I or $CuCl_2$, which process comprises (1) spraying a solution onto said substrate, wherein the solution comprises an inert solvent and (b1) a compound of formula II

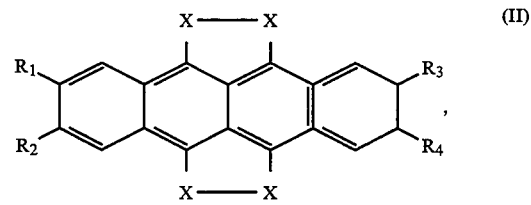

(b2) anhydrous $CuCl_2$, a $CuCl_2$ aquo complex, a $CuCl_2$ solvent complex or a monomeric, oligomeric or polymeric halogenated aromatic compound containing chlorine, bromine or iodine, which forms the radical cation salt of formula I when heated with a compound of formula II, and
(b3) a thermoplastic polymer or at least one starting compound for a thermosetting polymer, wherein the solution is heated to a temperature of from 50° to 350° C. before, during or after the spraying step, and
(2) subsequently evaporating the solvent.

2. A process of claim 1 wherein the solution is sprayed through a nozzle having an orifice with a diameter of from 0.1 to 10 mm.

3. A process of claim 2 wherein a pressure is required for spraying and the pressure is produced by a propellant gas.

4. A process according to claim 3, wherein the propellent gas is argon or nitrogen.

5. A process according to claim 3, wherein the pressure of the propellant gas is from $10^4$ to $10^6$ Pa.

6. A process according to claim 3, wherein the temperature of the nozzle heads is in the range from room temperature to 250° C.

7. A process according to claim 3, wherein the distance of the nozzle heads from the substrate is from 1 to 100 cm.

8. A process according to claim 3, wherein one or more than one nozzle head is used simultaneously.

9. A process according to claim 3, wherein the concentration of the compounds of formula II is 0.1% by weight to 20% by weight, based on the solution.

10. A process according to claim 3, wherein the concentration of the thermoplastic polymers or starting compounds for thermosetting polymers in the solution is up to 60% by weight.

11. A process according to claim 3, wherein the substrate is preheated.

12. A process according to claim 3, wherein the compound of formula I is selected from the group consisting of (tetrrathiotetracene)Cl$_{0.5}$, (tetrathiotetracene)Br$_{0.5}$, (tetrathiotetracene)I$_{0.75}$, (tetraselenotetracene)Cl$_{0.5}$, (tetraselenotetracene)Br$_{0.5}$, (2-fluoro- or 2,3-difluorotetrathio- or -tetrraselenotetracene)Cl$_{0.5}$, (2-fluoro- or 2,3-difluorotetrathio- or -tetraselenotetracene)Br$_{0.5}$ and (tetrathiotetracene)(CuCl$_2$)$_{0.4\ to\ 0.6}$.

13. A process according to claim 1, wherein the thermoplastic polymer is selected from the group consisting of polyolefins, polystyrene, polyvinyl chloride, polyvinylidene chloride, polyvinylidene fluoride, polyacrylates, polymethacrylates, polyamides, polyesters, polycarbonates, aromatic polysulfones, aromatic polyethers, aromatic polyether sulfones, polyimides and polyvinyl carbazole.

14. A process according to claim 1, wherein the solvent is evaporated in the temperature range from 50° to 250° C.

15. A process according to claim 1, wherein the ratio of the organic compound which contains chlorine, bromine or iodine to the compounds of formula II is from 10:1 to 1:5.

16. A process according to claim 1, wherein the halogenated organic compound is selected from the group consisting of tetrabromomethane, bromoform, trichlorobromomethane, hexachloropropene, hexachlorocyclopropane, hexachlorocyclopentadiene, hexachloroethane, N-chlorosuccinimide, octachloropropane, n-octachlorobutane, n-decachlorobutane, tetrabromoethane, hexabromoethane, tetrabromo-o-benzoquinone, 2,4,4,6-tetrabromo-2,5-cyclohexadienone, hexabromobenzene, chloranil, hexachloroacetone, 1,4,5,6,7,7-hexachloro-5-norbornene-2,3-dicarboxylic acid, 1,2,5,6,9, 10-hexabromocyclododecane, tetrachloroethylene, perchlorocyclopentadiene, perchlorobutadiene, dichloroacetaldehyde diethyl acetal, 1,4-dichlorobut-2-ene, 1,3-dichlorobut-2-ene, 3,4-dichlorobut-1-ene, tetrachlorocyclopropene, 1,3-dichloroacetone, 2,3,5,6-hexachloro-p-xylene, 1,4-bis(trichloromethyl)benzene, 1,3-dibromopropane, 1,6-dibromohexane, ethyl 3-chloropropionate, 3-chlorotoluene, methyl 2-chloropropionate, 2-chloroacrylonitrile, ethyl trichloroacetate, 1,2,3-trichloropropane, 1,1,2-trichloroethane, butyl chloroformate, trichloroethylene, 2,3-dichloromaleic anhydride, 1,12-dibromododecane, α,α'-dibromo-p-xylene, α,α'-dichloro-o-xylene, phenacyl chloride or bromide, 1,10-dibromodecane, α,α'-dichloro-p-xylene, α,α'-dibromo-m-xylene, iodoacetonitrile, 2,3-odichloro-5,6-dicyanobenzoquinone, methyl 2,3-dichloropropionate, 1-bromo-2-chloroethane, 1-bromo-2-chloropropane, 2-bromoethyl chloroformate, ethyl iodoacetate, N-chloro-, N-bromo- or N-iodosuccinimide or N-iodophthalimide, or mixtures thereof.

17. A process according to claim 1, wherein the halogenated organic compound is tri(C$_1$-C$_6$alkyl)ammonium hydrochloride and an aqueous solution of H$_2$O$_2$ is additionally used concurrently.

18. A process for preparing a conductive layer on a substrate wherein said conductive layer is a network of crystal needles embedded in a polymer matrix and said crystal needles consist essentially of a conductive radial cation salt of formula (I)

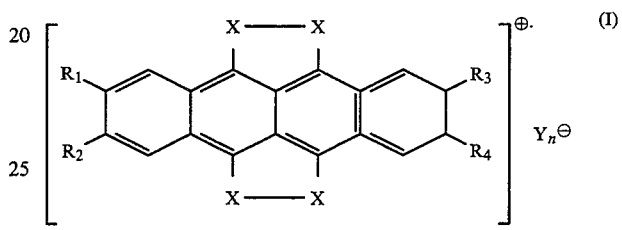

wherein X is S, Se or Te, n is a value from 0.3 to 0.9, R$_1$ is H, F, Cl or CH$_3$, and R$_2$, R$_3$ and R$_4$ are H, or R$_1$, R$_2$, R$_3$ and R$_4$ are each F or CH$_3$, or R$_1$ and R$_2$ are each F, Cl or CH$_3$ and R$_3$ and R$_4$ are each H, or R$_1$ and R$_3$ or R$_1$ and R$_4$ are each H, or R$_1$ and R$_3$ or R$_1$ and R$_4$ are each F and R$_2$ and R$_4$ or R$_2$ and R$_3$ are each H, and Y is Cl, Br, I or CuCl$_2$, which process comprises (1) spraying a suspension of the crystal needles in an inert solution onto said substrate, wherein the suspension additionally contains a dissolved thermoplastic polymer or at least one starting compound for a thermoplastic polymer, and (2) subsequently evaporating the solvent.

19. A process of claim 18 wherein the suspension is heated to a temperature of from 20° C. to 200° C. before, during or after the spraying step.

20. A process of claim 18 wherein the concentration of the radical cation salt of formula I is from 0.1% by weight to 20% by weight, based on the weight of the suspension.

* * * * *